UNITED STATES PATENT OFFICE.

GEORGE DUENSSER, OF GUTTENBERG, NEW JERSEY.

METHOD OF COVERING OR RE-COVERING SURFACES.

1,037,743.  Specification of Letters Patent.  Patented Sept. 3, 1912.

No Drawing.  Application filed October 3, 1911. Serial No. 652,573.

*To all whom it may concern:*

Be it known that I, GEORGE DUENSSER, a citizen of the United States, and resident of the town of Guttenberg, county of Hudson, State of New Jersey, have invented certain new and useful Improvements in Methods of Covering or Re-Covering Surfaces, of which the following is a specification.

This invention relates to a certain method of applying to surfaces a secondary covering, which may be ornamental or useful, or both ornamental and useful.

In my experiments, I have endeavored to produce a covering which would be water proof and elastic and of sufficient strength to withstand all ordinary wear and tear, and I have endeavored to produce a covering which would have the appearance and mechanical advantages of felt, burlap, or velours.

I have found that my secondary surface will serve well as a covering for phonograph tables, telephone bases, hat forms, or any other article that it has, in the past been found desirable to cover with felt or cloth, and I have found that as decorative covering for walls, caskets, and other surfaces my method and the results thereof have many very decided advantages.

In the best working of my method I employ a size or adhesive that has been the result of much study and I will include the adhesive in the description of the method and in the claims that follow the description.

The following is what I consider the best means of carrying out this invention: The surface to be covered is prepared by having all excessive roughness removed, and by being cleaned and freed from dust or other foreign matter that would prevent the adhesive from becoming well and firmly secured. The adhesive is then prepared in the following manner. In a gallon measure place 2 quarts stand oil, 1 quart amber varnish, 1 pint Japan driers, 1 pint linseed oil. Stir well together and apply with a brush. This size should be allowed to set after it has been applied to the wall until it becomes very sticky. A quantity of properly tinted fibrous material is now blown on to the size by means of any suitable blower such as a fan. Care must be taken that the fiber is blown onto and not into the size as it is my intention that the surface shall be soft and that the presence of the size will not be too easily discovered.

I have by this method produced many valuable and artificial cloth coverings but I do not confine myself to the use of wool or silk, or a mixture of wool and silk as I have found that wood fiber, asbestos and chamois as well as many other materials may be used, and very desirable effects, some of which may be entirely unlike cloth.

I have referred to my size as being waterproof and I prefer that it shall be so, the ingredients that I use are each water-proof and it is obvious then that the resultant mixture will be no less so.

I refer to the base of my size, or one of the principal elements as stand oil, and by this term I mean, a linseed or other paint oil that has been allowed to oxidize by a long time exposure to the elements or atmosphere.

I have found that artificially oxidized oils although useful in this mixture are not to be considered as even a substitute for the stand oil as many of the best features of this method would be lost were the stand oil omitted, such as the toughness, the maximum tenacity, and the ability to withstand the possibility of destruction through the actions of the elements.

It is well known that fibrous material has been used as a decoration upon walls and other surfaces, but all such use has been discouraged by the inability to obtain an adhesive that would prove suitable under all ordinary conditions, such an adhesive I have obtained only after long and careful study and much experiment.

Modifications may be made within the scope of the appended claims without departing from the principle or sacrificing the advantages of this invention.

Slight modifications in the formula may be made to obtain certain desirable results as for instance the quantity of driers may be changed for obvious reasons, and if in using a long heavy fiber it is found that merely impinging the fiber upon the adhesive does not give the resultant covering sufficient strength the adhesive may be thinned somewhat so that the fiber will adhere more closely to the surface.

What I claim and desire to secure by Letters Patent is:—

1. A method of covering surfaces, which consists of applying to the surface a size composed of definite parts of stand oil and amber varnish and certain quantities of other oils and driers, so compounded as to perform the double functions of an adhesive and preservative, and impinging thereon certain fibrous material.

2. The method herein described of producing a soft and fibrous covering for surfaces, which consists of applying to the surface to be covered a water-proof adhesive composed of four parts of stand oil, 2 parts of amber varnish, 1 part boiled linseed oil, and 1 part Japan driers and blowing upon said adhesive properly tinted fibrous material allowing the whole to dry without further manipulation.

Signed at New York city, N. Y., this 2nd day of October, 1911, in the presence of two witnesses.

GEORGE DUENSSER.

Witnesses:
G. E. STERRITTE,
ARTHUR PHELP MARR.